United States Patent
Rodriguez

(10) Patent No.: US 9,844,299 B1
(45) Date of Patent: Dec. 19, 2017

(54) MOTORIZED CHARCOAL GRILL

(71) Applicant: Hector Rodriguez, Cedar Hill, TX (US)

(72) Inventor: Hector Rodriguez, Cedar Hill, TX (US)

( * ) Notice: Subject to any disclaimer, the term of this patent is extended or adjusted under 35 U.S.C. 154(b) by 414 days.

(21) Appl. No.: 14/685,675

(22) Filed: Apr. 14, 2015

(51) Int. Cl.
*A47J 37/04* (2006.01)
*A47J 37/07* (2006.01)
*A23B 4/052* (2006.01)

(52) U.S. Cl.
CPC .......... *A47J 37/0745* (2013.01); *A23B 4/052* (2013.01); *A47J 37/041* (2013.01); *A47J 37/0704* (2013.01); *A23V 2002/00* (2013.01); *A47J 37/042* (2013.01)

(58) Field of Classification Search
CPC .... A47J 37/041; A47J 37/042; A47J 37/0704; A47J 37/0745
USPC ........ 99/421 H, 421 P, 421 M, 421 HH, 427, 99/482; 126/25 R, 25 AA
See application file for complete search history.

(56) References Cited

U.S. PATENT DOCUMENTS

| | | | | |
|---|---|---|---|---|
| 3,068,852 A | * | 12/1962 | Purtzer | A47J 37/0763 108/33 |
| 3,566,777 A | * | 3/1971 | Koziol | A47J 37/049 99/402 |
| 3,939,761 A | * | 2/1976 | McGinty | A47J 37/041 99/421 H |
| 4,760,776 A | * | 8/1988 | Beidler | A47J 37/041 99/419 |
| 5,001,971 A | | 3/1991 | Beller | |
| 5,140,896 A | | 8/1992 | Duran | |
| 5,168,798 A | | 12/1992 | Kristofich | |
| 5,172,628 A | | 12/1992 | Pillsbury | |
| 5,431,093 A | * | 7/1995 | Dodgen | A47J 37/0718 126/25 R |
| 5,460,080 A | * | 10/1995 | Maru, Jr. | A47J 37/041 99/420 |
| 5,669,290 A | | 9/1997 | Natsumi | |
| 5,711,209 A | * | 1/1998 | Guines | F24B 1/207 126/25 R |
| 5,720,217 A | | 2/1998 | Pappas | |
| 7,036,426 B2 | * | 5/2006 | Cheung | A47J 37/041 99/420 |
| 7,069,842 B1 | | 7/2006 | Liao | |
| 7,159,509 B2 | * | 1/2007 | Starkey | F24B 1/202 126/25 R |
| D583,192 S | | 12/2008 | Pailevanian | |
| 8,418,685 B2 | * | 4/2013 | Strauch | A47J 37/041 126/25 A |
| 8,851,063 B1 | * | 10/2014 | DeGraff | A23B 4/044 126/285 A |

* cited by examiner

*Primary Examiner* — Reginald L Alexander
(74) *Attorney, Agent, or Firm* — Kyle A. Fletcher, Esq.

(57) ABSTRACT

The motorized charcoal grill is a commercial grade transportable charcoal grill that is suitable for cooking large quantities of food. The motorized charcoal grill dedicates specific areas for automatic rotisseries, roasting racks, a side grill for quickly cooking small quantities and one or more ovens. The motorized charcoal grill is mounted on heavy duty casters so it can be moved easily. The motorized charcoal grill comprises a master pit, a side pit, a one or more ovens, a frame and a drive.

13 Claims, 5 Drawing Sheets

MOTORIZED CHARCOAL GRILL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cookers, cooking equipment and barbecue equipment, more specifically, an accessory configured for use as a charcoal grill.

SUMMARY OF INVENTION

The motorized charcoal grill is a commercial grade transportable charcoal grill that is suitable for cooking large quantities of food. The motorized charcoal grill dedicates specific areas for automatic rotisseries, roasting racks, a side grill for quickly cooking small quantities and one or more ovens. The motorized charcoal grill is mounted on heavy duty casters so it can be moved easily.

These together with additional objects, features and advantages of the motorized charcoal grill will be readily following detailed description of the presently preferred, but nonetheless illustrative, embodiments when taken in conjunction with the accompanying drawings.

In this respect, before explaining the current embodiments of the motorized charcoal grill in detail, it is to be understood that the motorized charcoal grill is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized charcoal grill.

It is therefore important that the claims be regarded as including such equivalent construction insofar as they do not depart from the spirit and scope of the motorized charcoal grill. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons intended to limit the scope of the appended claims. Furthermore, there is no intention to be bound by any expressed or implied theory presented in the preceding technical field, background, brief summary or the following detailed description.

Figure 1:
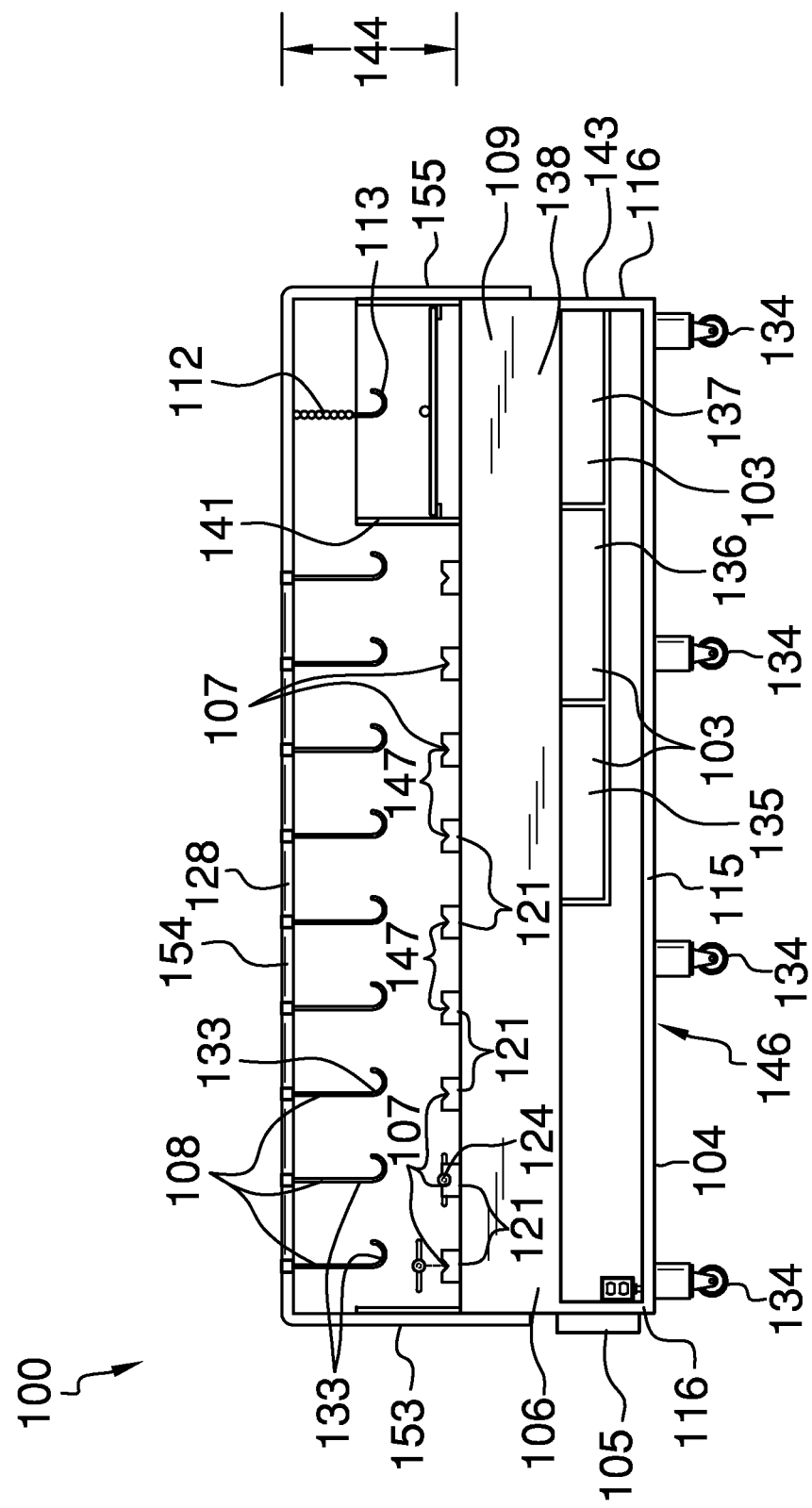
FIG. 1 is a front view of an embodiment of the disclosure.
Figure 2:
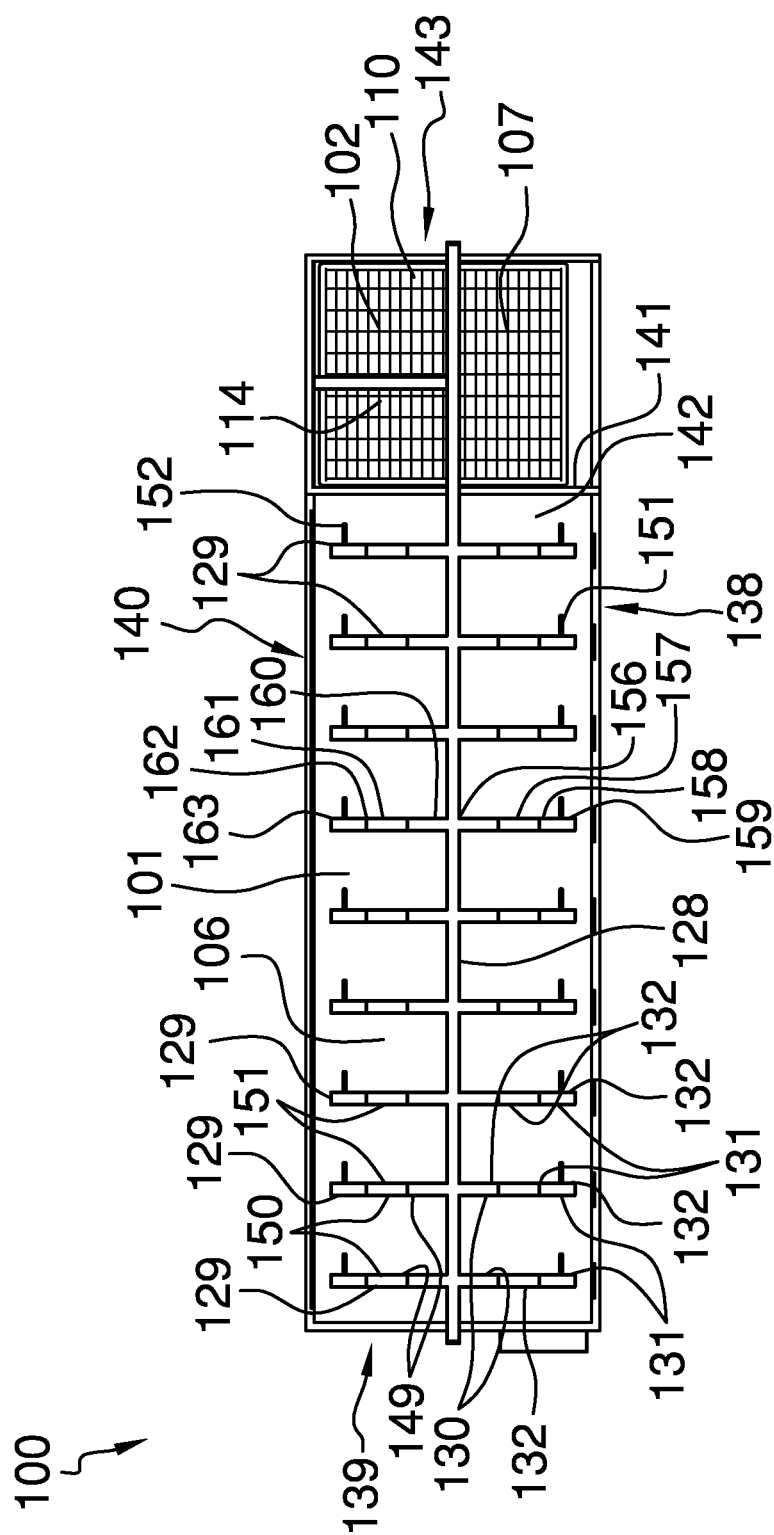
FIG. 2 is a top view of an embodiment of the disclosure.
Figure 3:
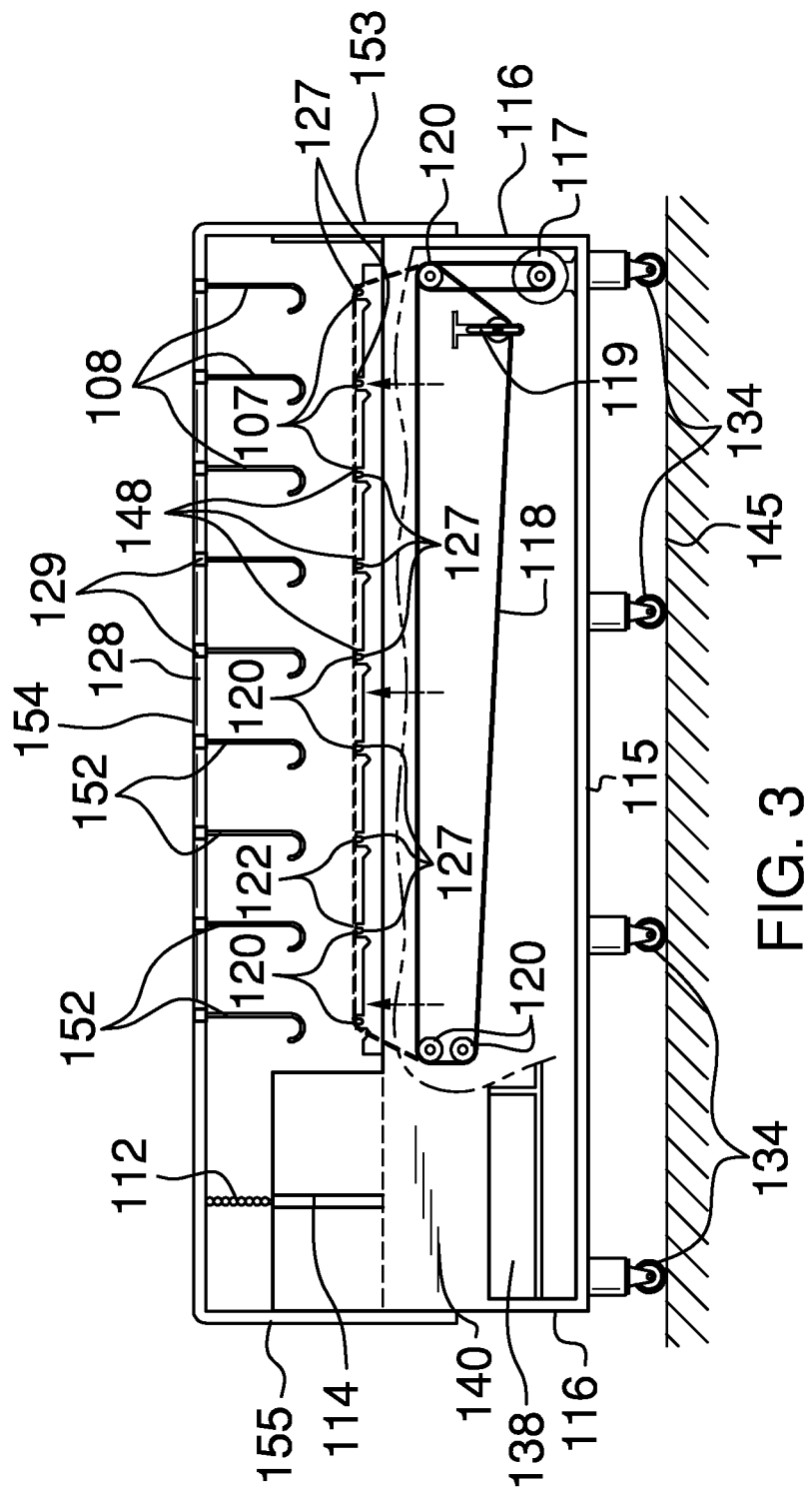
FIG. 3 is a back view of an embodiment of the disclosure.
Figure 4:
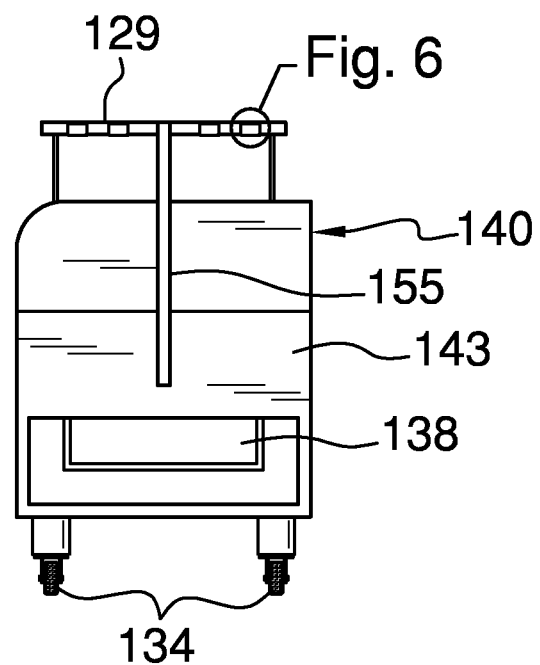
FIG. 4 is a side view of an embodiment of the disclosure.
Figure 5:
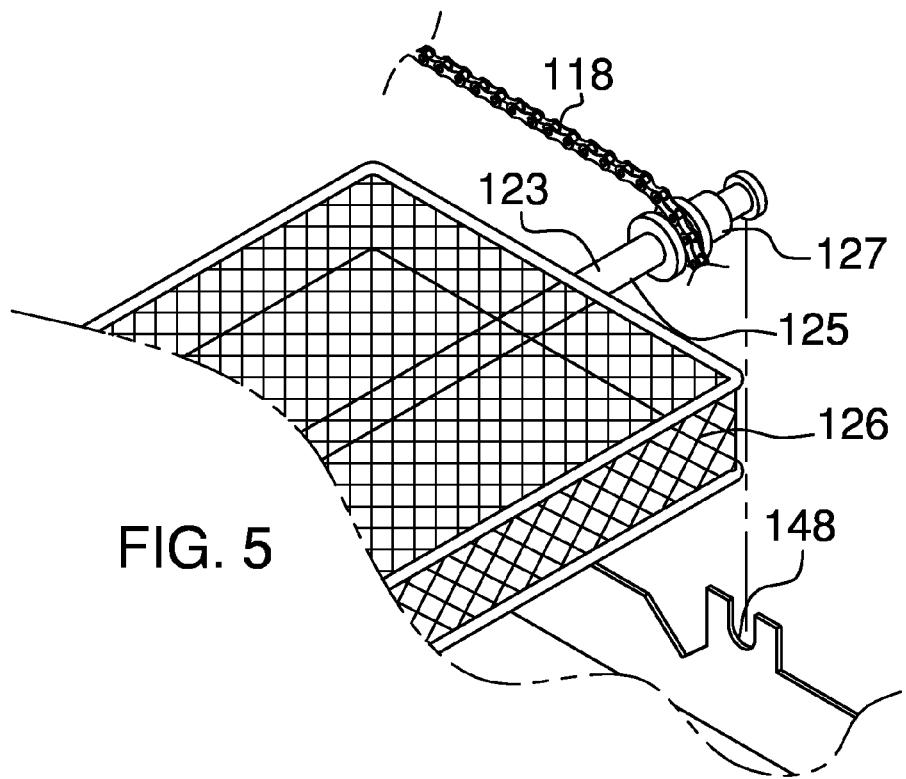
FIG. 5 is a detail view of an embodiment of the disclosure.
Figure 6:
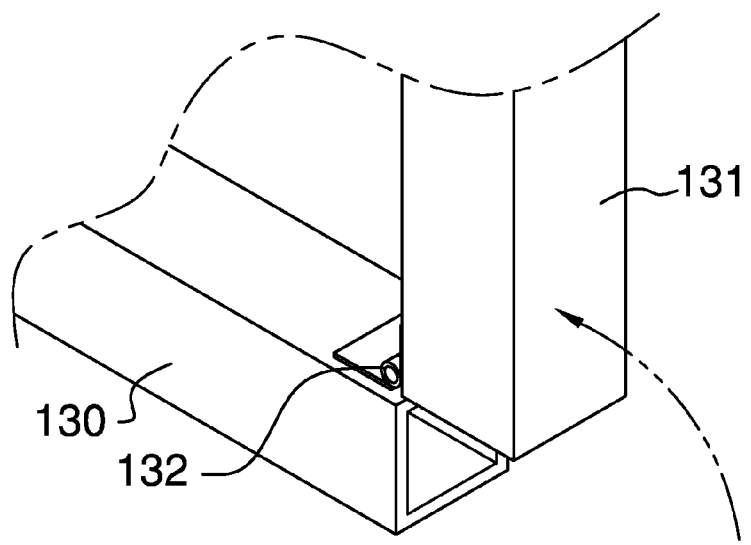
FIG. 6 is a detail view of an embodiment of the disclosure.

Detailed reference will now be made to a first potential embodiment of the disclosure, which is illustrated in FIGS. 1 through 6. The motorized charcoal grill 100 (hereinafter invention) is a transportable charcoal grill comprising a master pit 101, a side pit 102, a one or more ovens 103, a frame 104 and a drive 105. The master pit 101 comprises a master charcoal bed 106, a plurality of rotisseries 107, and a plurality of smoking racks 108.

The master charcoal bed 106 is a container in which charcoal is burned as fuel for cooking food with the plurality of rotisseries 107 and the plurality of smoking racks 108. The master charcoal bed 106 is bounded on five sides by a front wall 138, a left wall 139, a rear wall 140, an inner wall 141, and a fire surface 142. The burning charcoal rests on the fire surface 142 and is contained by the front wall 138, the left wall 139, the rear wall 140, and inner wall 141.

In the first potential embodiment of the disclosure, the front wall 138, the left wall 139, the rear wall 140, the inner wall 141, and the fire surface 142 are made of metal. Suitable steel. In the first potential embodiment of the disclosure, cast iron is preferred. The front wall 138, the left wall 139, the rear wall 140, the inner wall 141, and the fire surface 142 can be joined using several methods including, but not limited to, welding and or the use of hardware. In the first potential embodiment of the disclosure, welding is preferred.

Each of the plurality of rotisseries 107 comprises a first support 121, a second support 122, a skewer 123, a wire cage 126 and a support capture 127. The skewer 123 comprises a handle 124 and a rod 125. Placed around the skewer 123 is a wire cage 126 that is adapted to receive the food that will be cooked in the rotisserie. The skewer 123 and wire cage 126 are held in place over the master charcoal bed 106 by placing the rod 125 in the first support 121 and second support 122. The first support 121 is a metal structure attached to the front wall 138 of the master charcoal bed 106. The first support 121 has a small has a small V shaped notch 147 sized to receive the skewer 123.

The second support 122 is a metal structure attached to the rear wall 140 of the master charcoal bed 106. The second support 122 has a U shape notch 148 sized to receive the skewer 123. Associated with the second support 122 is a support capture 127. The support capture 127 is a bushing with one of a plurality of sprockets 120 attached to its exterior. The rod bushing. When the drive 105 is in operation, it rotates the one of the plurality of sprockets 120 attached to the support capture 127, which rotates the rod 125, skewer 123, and wire cage 126.

The first support 121 and the second support 122 can be made of several metals including, but not limited to, cast iron and stainless steel. In the first potential embodiment of the disclosure, stainless steel is preferred. The first support 121 and the second support 122 can be joined to the master charcoal bed 106 using several methods including, but not limited to, welding and or the use of hardware. In the first potential embodiment of the disclosure, hardware is preferred. The skewer 123 and the wire cage 126 can be made of aluminum. Commercially available hardware was used for the support captures 127.

The plurality of smoking racks 108 comprises a center support 128 and a plurality of crossbeams 129. The purpose of the plurality of smoking racks 108 is to provide a location from which to hang food over the master charcoal bed 106. This allows the food to receive smoke and indirect heat from the master charcoal bed 106.

The purpose of the center support 128 is to support the plurality of crossbeams 129 and to raise the plurality of crossbeams 129 above the plurality of rotisseries 107. The center support 128 comprises a first metal bar 153, a second metal bar 154 and a third metal bar 155. The first metal bar 153 is attached to the left wall 139. The third metal bar 155 is attached to the right wall 143. The second metal bar 154 is attached to the first metal bar 153 and third metal bar 155. A rear support 114 is attached to the second metal bar 154 over the side pit 102 to provide additional support. The rear support 114 is discussed in more detail elsewhere in this disclosure.

Each of the plurality of crossbeams 129 comprise a first arm 130, a second arm 131, a first hinge 132, a first smoke hook 133 and a third arm 149, a fourth arm 150, a second hinge 151 and a second smoke hook 152. The first arm 130 is further defined by a first end 156 and a second end 157. The second arm 131 is further defined by a third end 158 and a fourth end 159. The third arm 149 is further defined by a fifth end 160 and a sixth end 161. The fourth arm 150 is further defined by a seventh end 162 and an eighth end 163.

The first end 156 of the first arm 130 and the fifth end 160 of the third arm 149 are attached to the center support 128 so that they are opposite each other essentially forming a perpendicular line to the center support 128. The second end 157 of the first arm 130 is attached to the third end 158 of the second arm 131 using the first hinge 132. The sixth end 161 of fourth arm 150 using the second hinge 151. The purpose of the first hinge 132 is to allow the second arm 131 to be moved out of the way of the cook when not in use. The purpose of the second hinge 151 is to allow the fourth arm 150 to be moved out of the way of the cook when not in use. A hole is formed in the fourth end 159 of the second arm 131 to receive the first smoke hook 133. The eighth end 163 of the fourth arm 150 receives the second smoke hook 152. The purpose of the first smoke hook 133 and the second smoke hook 152 is to hold food over the master charcoal bed 106.

The center support 128, the first arm 130, the second arm 131, the third arm 149, and the fourth arm 150 are made of metal. Suitable metals include, but are not limited to, cast iron, stainless steel, and aluminum. In the first potential embodiment of the disclosure, stainless steel square tubing is preferred. Commercially available hooks and hinges were used for the first hinge 132, the first smoke hook 133, the second hinge 151 and the second smoke hook 152.

The side pit 102 comprises a side charcoal bed 109, a grate 110, a support chain 112, a support hook 113, and a rear support 114. The side charcoal bed 109 is a five sided container in which charcoal is burned as fuel for cooking food on a grate 110. The side charcoal bed 109 is bounded on five sides by the wall 143, and the fire surface 142. The burning charcoal rests on the fire surface 142 and is contained by the front wall 138, the inner wall 141, the rear wall 140, and right wall 143. The side charcoal bed 109 and the master charcoal bed 106 share the same fire surface 142, inner wall 141, front wall 138 and rear wall 140.

The height 144 of the inner wall 141, right wall 143 and the section of the rear wall 140 that encloses the side charcoal bed 109 are raised above the height 144 of the section of the front wall 138 that encloses the master charcoal bed 106 and the section of the rear wall 140 that encloses the master charcoal bed 106. The reason for raising the height 144 of the inner wall 141, right wall 143 and the section of the rear wall 140 that encloses the side charcoal bed 109 is to segregate the side pit 102 from the master pit 101. The side pit 102 fitted with a grate 110 that holds the food over the side charcoal bed 109.

The grate 110 is a framework of crossed metal bars upon which the food can be placed. The definition of grate 110 in this disclosure also specifically includes a grill, which is a framework of parallel metal bars upon which food can be placed for cooking. The grate 110 is placed on the top edge of the front wall 138 and a series of metal ridges formed on the inner wall 141, rear wall 140 and right wall 143. A support hook 113 used to raise the grate 110 and secure the grate 110 to the support hook 113. The ability to raising the grate 110 allows access to the charcoals for heat management purposes. A rear support 114, which is a metal structure that connects the rear wall 140 of the master charcoal bed 106 to the center support 128, provides additional support to the center support 128 to compensate for the weight of the grate 110. The center support 128 is discussed in detail elsewhere in this disclosure.

The fire surface 142 is made from a metal plate. On the side of the metal plate opposite from where the charcoal is burned are mounted one or more ovens 103. The purpose of the one or more ovens 103 is to take advantage of the indirect heat generated by the burning of charcoal on the fire surface 142. The metal plate that makes the fire surface 142 conducts the heat from the charcoal throughout the entire plate. The one or more ovens 103 attached to the metal plate that makes the fire surface 142 take advantage of this indirect heat by creating a space that can be used for baking or cooking methods that require radiant heat. In the first potential embodiment of the disclosure, the one or more ovens 103 comprises a first oven 135, a second oven 136 and a third oven 137.

The right wall 143 and the one or more ovens 103 are made of metal. Suitable metals include, but are not limited to, cast iron and stainless steel. In the first potential embodiment of the disclosure, cast iron is preferred. The right wall 143 and the one or more ovens 103 can be joined to the invention 100 using several methods including, but not limited to, welding and or the use of hardware. In the first potential embodiment of the disclosure, welding is preferred.

The frame 104 acts as a structure which supports the master charcoal bed 106 and side charcoal bed 109 and raises the invention 100 off the ground 145. The frame 104 comprises a base 115, a plurality of posts 116 and a plurality of casters 134. The purpose of the plurality of casters 134 is to bear the weight of the invention 100 as it sits on the ground 145, to raise the base 115 off the ground 145 and to allow for easily moving the invention 100. Each of the plurality of casters 134 is mounted on the bottom 146 of the base 115. The base 115 is a metal plate that supports the plurality of posts 116. Each of the plurality of posts 116 projects perpendicularly away from the base 115 in the direction away from the ground 145. Each of the plurality of posts 116 is attached to and supports the fire surface 142. In the first potential embodiment of the disclosure, four posts and eight casters were used.

The frame 104 is made of metal. Suitable metals include, but are not limited to, cast iron and stainless steel. In the first potential embodiment of the disclosure, cast iron is preferred. The components of the frame 104 can be joined to the invention 100 using several methods including, but not limited to, welding and or the use of hardware. In the first potential embodiment of the disclosure, welding is preferred.

The drive 105 comprises a motor 117, a drive chain 118, a tensioner 119, and a plurality of sprockets 120. One of the plurality of sprockets 120 is placed on the support capture 127 of each of the plurality of rotisseries 107 included with invention 100. Additional sprockets are added to the invention 100 to complete the loop of the drive chain 118. A tensioner 119 is added to control the tension of the drive chain 118. The motor 117 is an electric motor that includes the controls and power connections necessary for operation. Electric motors and controls are well known and documented in the art. Chain drive systems are well known and documented in the art. In the first potential embodiment of the disclosure, a commercially available electric motor and associated controls were used. In the first potential embodiment of the disclosure, commercially available sprockets, chains, and tensioners were used.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A charcoal grill comprising
a master pit, a side pit, a one or more ovens, a frame and a drive;
wherein the drive is motorized;
wherein the charcoal grill comprises one or more segregated charcoal beds;
wherein the charcoal grill is transportable;
wherein the master pit comprises a master charcoal bed, a plurality of rotisseries, and a plurality of smoking racks;
wherein the side pit comprises a side charcoal bed and a grate;
wherein the drive comprises a motor, a drive chain, and a plurality of sprockets;
wherein the master charcoal bed is a container in which charcoal is burned;
wherein the master charcoal bed is further defined by a front wall, a left wall, a rear wall, an inner wall, and a fire surface;
wherein the burning charcoal rests on the fire surface and is contained by the front wall, the left wall, the rear wall, and inner wall;
wherein each of the plurality of rotisseries comprises a first support, a second support, a skewer, a wire cage and a support capture;
wherein the skewer comprises a handle and a rod;
wherein a wire cage is placed around the skewer;
wherein the skewer and wire cage are secured in place by placing the rod in the first support and second support;
wherein the first support is a metal structure with a notch sized to receive the skewer;
wherein the second support is a metal structure with a notch sized to receive the skewer;
wherein a support capture is attached to the second support;
wherein the support capture is a bushing with one of a plurality of sprockets;
wherein the plurality of smoking racks comprises a center support and a plurality of crossbeams.

2. The charcoal grill according to claim 1 wherein
the center support comprises a first metal bar, a second metal bar and a third metal bar;
wherein the first metal bar is attached to the left wall;
wherein the third metal bar is attached to the right wall;
wherein the second metal bar is attached to the first metal bar and the third metal bar.

3. The charcoal grill according to claim 2 wherein
each of the plurality of crossbeams comprises a first arm, a second arm, a first hinge, a first smoke hook and a third arm, a fourth arm, a second hinge and a second smoke hook;
wherein the first arm is further defined by a first end and a second end;
wherein the second arm is further defined by a third end and a fourth end;
wherein the third arm is further defined by a fifth end and a sixth end;
wherein the fourth arm is further defined by a seventh end and an eighth end;
wherein the first end of the first arm and the fifth end of the third arm are attached to the center support;
wherein the second end of the first arm is attached to the third end of the second arm using the first hinge;
wherein the sixth end of the third arm is attached to the seventh end of the fourth arm using the second hinge;
wherein the fourth end of the second arm receives the first smoke hook;
wherein a hole is formed in the eighth end of the fourth arm to receive the second smoke hook;
wherein the side charcoal bed is a container in which charcoal is burned.

4. The charcoal grill according to claim 3 wherein
the side charcoal bed is further defined by the front wall, the inner wall, the rear wall, the right wall, and the fire surface;
wherein the burning charcoal rests on the fire surface and is contained by the front wall, the inner wall, the rear wall, and right wall;
wherein the height of the inner wall, right wall and the section of the rear wall that encloses the side charcoal bed are raised above the height of the section of the front wall that encloses the master charcoal bed.

5. The charcoal grill according to claim 4 wherein the master charcoal pit and the side charcoal pit are segregated.

6. The charcoal grill according to claim 5 wherein the side pit is fitted with a grate.

7. The charcoal grill according to claim 6 wherein a support hook is attached to the center support; and
wherein a support chain is used to raise the grate.

8. The charcoal grill according to claim 7 wherein the fire surface is made from a metal plate;
wherein on the side of the metal plate opposite from where the charcoal is burned are mounted the one or more ovens.

9. The charcoal grill according to claim 8 wherein a first oven, a second oven, and a third oven are attached to the fire surface.

10. The charcoal grill according to claim 8 wherein
the frame comprises a base, a plurality of posts and a plurality of casters;
wherein the frame raises the master charcoal pit and side charcoal pit off the ground.

11. The charcoal grill according to claim 10 wherein
the base is a metal plate that supports the plurality of post;
wherein each of the plurality of posts projects perpendicularly away from the base in the direction away from the ground;
wherein each of the plurality of posts is attached to and supports the fire surface.

12. The charcoal grill according to claim 11 wherein
one of the plurality of sprockets is placed on the support capture of each of the plurality of rotisseries;
wherein a tensioner is added to control the tension of the drive chain;
wherein the motor is used to drive the drive chain.

13. The charcoal grill according to claim 12 wherein
wherein eight casters are provided;
wherein four posts are provided;
wherein nine rotisseries are provided; and
wherein nine crossbars are provided.

* * * * *